United States Patent
Madan et al.

(10) Patent No.: US 7,921,129 B2
(45) Date of Patent: *Apr. 5, 2011

(54) EVALUATING QUERIES AGAINST IN-MEMORY OBJECTS WITHOUT SERIALIZATION

(75) Inventors: Umesh Madan, Bellevue, WA (US); Geary L. Eppley, Carnation, WA (US); David Wortendyke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/876,564

(22) Filed: Oct. 22, 2007

(65) Prior Publication Data
US 2008/0040333 A1    Feb. 14, 2008

Related U.S. Application Data

(62) Division of application No. 10/783,599, filed on Feb. 20, 2004, now Pat. No. 7,287,035.

(51) Int. Cl.
*G06F 7/00* (2006.01)
*G06F 17/30* (2006.01)

(52) U.S. Cl. .................................................. 707/759
(58) Field of Classification Search .......... 707/1, 100, 707/101, 102, 758, 759
See application file for complete search history.

(56) References Cited

U.S. PATENT DOCUMENTS

| | | | |
|---|---|---|---|
| 6,898,604 B1 * | 5/2005 | Ballinger et al. | 707/101 |
| 6,917,937 B1 | 7/2005 | Rubendall | |
| 6,920,461 B2 | 7/2005 | Hejlsberg et al. | |
| 2003/0144849 A1 | 7/2003 | Kakivaya et al. | |
| 2003/0167277 A1 * | 9/2003 | Hejlsberg et al. | 707/102 |
| 2003/0172196 A1 * | 9/2003 | Hejlsberg et al. | 709/328 |
| 2004/0194105 A1 * | 9/2004 | Shenfield et al. | 718/100 |

* cited by examiner

*Primary Examiner* — Hosain T Alam
*Assistant Examiner* — Navneet K Ahluwalia
(74) *Attorney, Agent, or Firm* — Lee & Hayes, PLLC (57) ABSTRACT

At least one implementation described herein relates to evaluating queries structured according to a first format against one or more objects structured according to a second, different format without serializing the object. Typically, evaluating an XML (eXtensible Markup Language) query against a CLR (Common Language Runtime) object required serializing the CLR object and deriving an XML construct from the serialized data. The query is then be evaluated against the XML construct. In the described implementations, significant system resources are realized by creating an infoset model that maps properties of an object to an object infoset. The query is then evaluated using the infoset to locate object values and, thus, no serialization is required. Dynamically generated IL is used and re-used to efficiently perform subsequent evaluation steps on similar queries.

18 Claims, 8 Drawing Sheets

```
public class book 102
{
    string Title; 104
    string Author; 106
    chapter[ ] chapters; 108
}
public class chapters 110
{
    int chapternum; 112
    string chaptertitle; 114
    string text; 116
}
```

Fig. 1a
Background

```
public class book 122
{
    Moby Dick    124
    Melville        126
} public class chapters 128
{
    1               130
    Loomings        132
    Call me Ishmael.... 134
}
public class chapters 136
{
    2               138
    The Carpet-Bag  140
    I stuffed a shirt.... 142
}
```

Fig. 1b
Background

Fig. 2
Background

```
302 Infoset: Envelope
   {
   304  Children   // Envelopes have the following child XML elements
      {
        306  ActionHeader  [property ActionHeader]
        308  Version       [property Version]
      }
   }

310 Infoset: ActionHeaderObj
   {
   312  Children   // ActionHeaderObjs have the child XML elements:
         {
            314  Action      [property ActionUri]
            316  HeaderName  [property Name]
         }
   318  Attributes  // ActionHeaderObjs have the XML attributes:
         {
            320  ID [property ID]
         }
   }
```

Infoset Model
300

Fig. 3a

```
332  <Envelope>                    ╱─342
    334  <ActionHeader ID = >
        336  <Action></Action>
        338  <Headername></Headername>
        </ActionHeader>
    340  <Version></Version>
</Envelope>
```

XML Template
330

EVALUATING QUERIES AGAINST IN-MEMORY OBJECTS WITHOUT SERIALIZATION

RELATED APPLICATION

The present application claims priority and is a divisional application to U.S. patent application Ser. No. 10/783,599, U.S. Pat. No. 7,287,035, entitled, "Evaluating Queries Against In-Memory Objects Without Serialization", to Madan et al., filed on Feb. 20, 2004, to be issued on Oct. 23, 2007, which is incorporated by reference herein for all that it teaches and discloses.

TECHNICAL FIELD

The systems and methods described herein generally relate to filtering input for data processing using filters and, more particularly, to systems and methods for evaluating an object of one type against a filter of another type.

BACKGROUND

Computing systems—i.e. devices capable of processing electronic data such as computers, telephones, Personal Digital Assistants (PDA), etc.—communicate with other computing systems by exchanging data according to a communications protocol that is recognizable by the systems. A system utilizes filters to analyze data that is sent and/or received by the system and to determine if and how the data will be processed further.

Filters are a set of one or more queries against which an input is tested. For purposes of the present discussion, the terms "filter" and "query" are singular and interchangeable, and multiple queries are said to comprise a "filter table." One way filters are used is to allow an input into a system only if the input satisfies one or more particular filters. Another way filters are used is for message processing, such as with a mail program. Inputs that satisfy a filter associated with a particular mailbox are forwarded to the mailbox. Filters can also be used for file access algorithms, security controls, etc.

Filters are written in a suitable query language such as XPath or XQuery. Query languages are designed to operate on data structured according to a particular format. For example, XPath and XQuery are designed to operate on data structured as XML (eXtensible Markup Language). But sometimes, a filter designed to operate on data structured according to one format are called on to evaluate data structured according to another format. In such instances, a translation process must be performed so that the object can be tested against the filter. However, data transform procedures can consume significant resources.

Once such instance occurs when an XPath query is called on to evaluate a CLR (Common Language Runtime) or Java object. A typical way to perform this evaluation is to serialize the object and then use the serialized data to build a template of the object according to XML. The XPath query can then be evaluated against the object using the XML structure.

But the serialization process is expensive because it involves maintaining buffers, writing strings, etc. The resultant XML must then be parsed to build (typically) a DOM. Furthermore, an object is often at the root of a tree/graph of objects and can have references to other objects. Therefore, serializing an object can sometimes involve serializing multiple objects which adds to the overhead required for processing.

SUMMARY

At least one implementation described herein relates to evaluating queries (i.e. filters) constructed according to a query language (e.g. XPath) against an object constructed according to a non-conforming format (e.g. a CLR object) without serializing the object. An infoset (information set) model that conforms to a query language format (e.g. XML for XPath) is derived that maps object fields and properties to infoset information items. An information item is identified and a corresponding property is located in the CLR object. The data related to the corresponding CLR object property is retrieved and compared to the query value to determine if the values match. No serialization is required in this process.

An infoset model is only developed to the extent necessary to locate a property that corresponds to an information item being tested. Once the object value is determined and tested, further development of the infoset model is unnecessary. The portion of the infoset model that has been developed is stored so that subsequent queries against the same object can utilize the same infoset model and augment it if further development of the model is required.

In at least one implementation, opcodes are generated that, when executed, evaluate a query. The opcodes dynamically generate 'helper' code that performs a function that is the same as what would be performed by intermediate language (IL) instructions compiled from source code. Generating code implies emitting IL instructions into dynamic assemblies. This generated IL is just in time (JIT) compiled in a .NET runtime and allows the opcodes to retrieve property values and fields directly from CLR objects as though the opcodes were executing compiled hand-written source code.

BRIEF DESCRIPTION OF THE DRAWINGS

A more complete understanding of exemplary systems and methods described herein may be had by reference to the following detailed description when taken in conjunction with the accompanying drawings wherein:

FIG. 1a is a representation of an object declaration.

FIG. 1b is an instance of an object according to the object declaration of FIG. 1a.

FIG. 3b is a representation of an XML template corresponding to the infoset model depicted in FIG. 3a.

DETAILED DESCRIPTION

The present disclosure relates to evaluating a query (i.e. filter) against a non-conforming object. As used herein, the term "non-conforming" means that the object is structured according to a format that is different than a format to which the query conforms. For example, the following description relates specifically to evaluating an XPath query against a CLR (Common Language Runtime) object. It is noted, however, that the subject matter is not necessarily limited to XPath queries or CLR objects. The techniques described herein may be used with other types of queries that are evaluated against objects that do not conform to the query format.

A messaging system is one type of system that utilizes filters or queries to process inputs. Messaging systems utilize message handlers (i.e. message routers) that refer to filter tables to make processing decisions about particular messages. Filters stored in the filter table test a set of conditions, or rules, against message content and return a value of true if the conditions are satisfied.

Message handlers typically bind a filter to an action that is executed when the filter is satisfied. The logic of such binding usually takes the form of "If message matches filter X, take action Y" (action Y is associated with filter X). The logic may also represent "Test a set of filters, S, against a message and select a subset, S1, of filters that match the message; then take one or more actions associated with the filters of S1."

Messaging systems modeled on XML utilize filters defined using an XML query language, such as XPath. However, such systems often deal with messages that are non-XML based, such as messages and/or message headers that are strongly-typed in-memory CLR objects, which are designed primarily for efficient programmatic access.

A typical way to run an XPath query over a CLR object is to serialize the object (i.e. message objects) and convert the serialized data to an XML format. An alternative method could maintain a parallel XML version of every message header and property that is used solely for query processing, including headers that are never transmitted. Unfortunately, either of these methods imposes a significant burden on computational resources.

A substantially more efficient method and system for performing such methods are described herein. In the described systems and methods, an XPath query is evaluated against in-memory CLR objects directly, without requiring serialization of the CLR object. Such techniques result in performance gains of several orders of magnitude over the other techniques referenced above.

Exemplary Object Structure

Figures 1A, 1B:
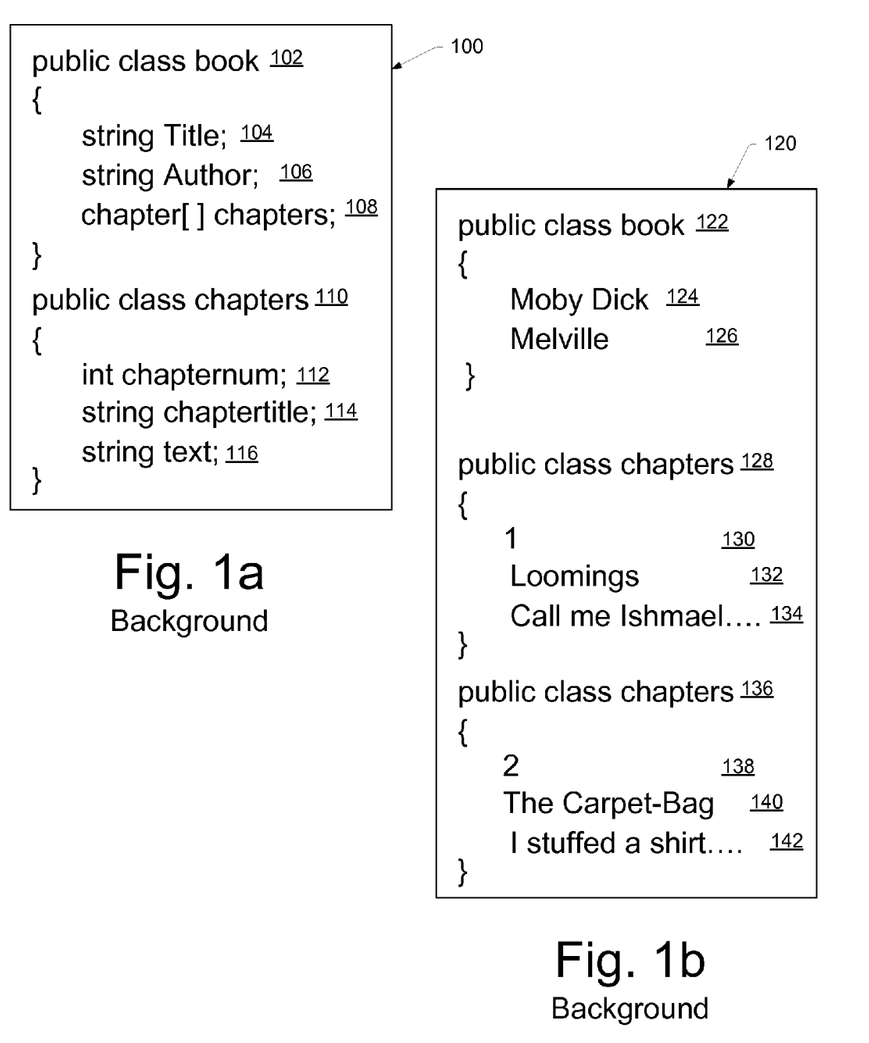

FIG. 1a depicts an exemplary object structure 100 (expressed here by a class definition for a "book" object) that could be used to represent information regarding one or more book objects. The object structure 100 includes a root class 102 ("public class book"). The root class 102 includes a "Title" property 104, an "Author" property 106 and a "chapter" array property 108 ("chapters)".

The exemplary object structure 100 also includes a class 110 ("public class chapters") that has a "chapternum" property 112 (identifying a chapter number), a "chapter title" property 114, and a "text" property 116. It is noted that the object structure 100 could include several other properties that are not shown.

It is noted that the exemplary object 100 takes a hierarchical form just as XML data is arranged hierarchically. The fact that both types of data are hierarchical provides a natural and convenient way to relate an object to an XML construct.

FIG. 1b is an instance of an object 120 according to the object structure 100 shown in FIG. 1a. The object 120 is populated according to the novel "Moby Dick" and, therefore, has a title property 122 with a value of "Moby Dick." The object 120 also includes an author property 124 having a value of "Melville."

The object also includes two instances of the public class "chapters" (128, 136). The first instance 128 has a chapternum property 130 having a value of "1" that corresponds to chapter one of the novel. The first instance 128 also has a chapter title property 132 with a value of "Loomings" and a text property that includes the contents of the first chapter (beginning with "Call me Ishmael.").

The second instance 136 has a chapternum property 138 having a value of "2", a chapter title property 140 with a value of "The Carpet-Bag", and a text property 142 that includes the contents of the second chapter of the novel (which begins with "I stuffed a shirt or two . . . "). Other instances of the public class "chapters" may be included but are not shown here.

The object 120 is a typical non-XML object that may be encountered in query processing. Further examples will refer to the exemplary object 120 to further demonstrate the techniques shown and described herein.

Exemplary XML Construct

Figure 2:
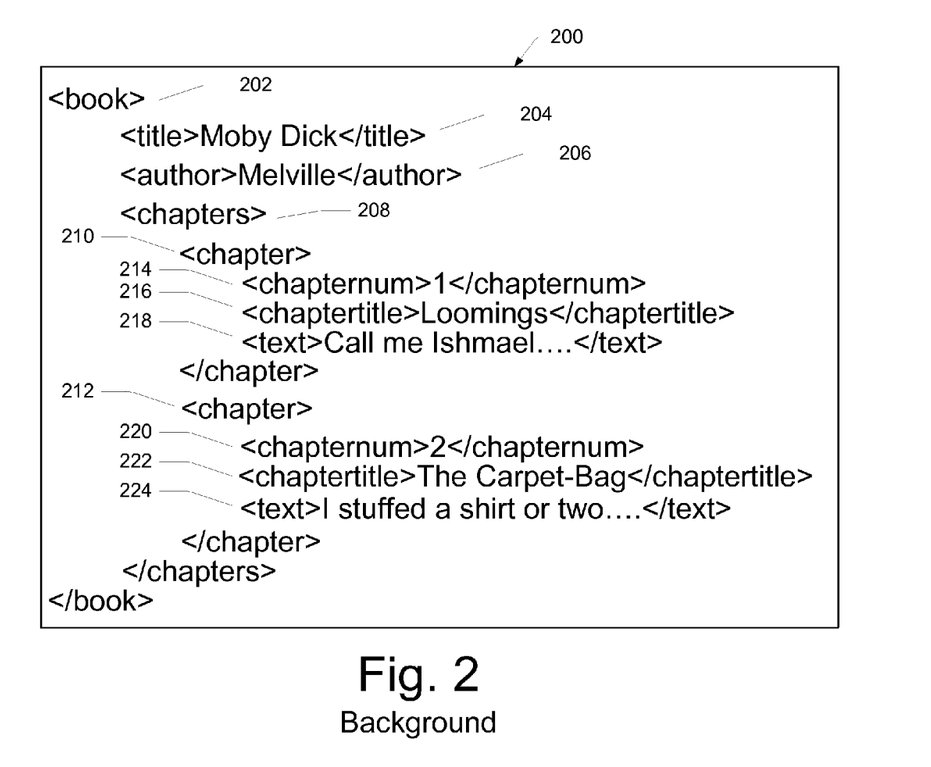
FIG. 2 is a representation of an XML construct corresponding to the object of FIG. 1b.

FIG. 2 depicts an exemplary XML construct 200 that corresponds to the exemplary object 120 shown in FIG. 1b. In other words, if a similar instance of the object 120 were written in XML, the result would appear as shown in FIG. 2. The XML construct 200 is shown populated with data from "Moby Dick" similar to FIG. 1b. For convenience, only a portion of the book instance is shown.

The XML construct 200 includes a root element ("book") 202. The root element 202 has a first child node 204 ("Title") having a value of "Moby Dick", a second child node 206 ("Author") having a value of "Melville" and a third child node 208 ("chapters"), referred to below as a "chapters node" 208.

The chapters node 208 has a first chapter node 210 and a second chapter node 212. Each chapter node 210, 212 includes three child nodes: a chapter number node 214, 220; a chapter title node 216, 222; and a text node 218, 224. (The nodes are also known as XML elements, but are referred to herein as nodes to better allude to the hierarchical nature of XML.)

The chapter number node 214 of the first chapter node 210 has a value of "1". The chapter title node 216 of the first chapter node 210 has a value of "Loomings", and the text node 218 of the first chapter node 210 has a value beginning with "Call me Ishmael."

The second chapter node 212 includes a chapter number node 220 having a value of "2", a chapter title node 222 with a value of "The Carpet-Bag" and a text node having a value beginning with "I stuffed a shirt or two . . . "

The similarity between the hierarchies of the XML construct 200 and the object 120 (FIG. 1b) are apparent. It is this hierarchical nature of the construct 200 and the object 120 that are exploited in the systems and methods described herein to allow elements and values to be located in a non-XML object without first having to serialize the object into an XML format. Since the XML format that would result from serialization can be determined prior to serialization, the need to serialize the non-XML object is rendered unnecessary.

Exemplary Infoset

Path expression target XML Infosets whereas CLR objects have no notion of XML constructs such as elements and attributes. To execute XML queries directly on CLR objects, the CLR objects must be interpreted as XML. To do so, the same heuristics that are used to serialize CLR objects can be applied to interpret the CLR objects as XML, but without serialization.

An infoset model for a CLR-Type is a mapping of the CLR-Type properties to XML. An infoset model for a CLR-Type provides a fixed template for its corresponding XML. Although the XML text nodes will vary for every instance of the Type, the XML markup—element tags, attribute names and namespaces—remain unchanged.

Figure 3A:
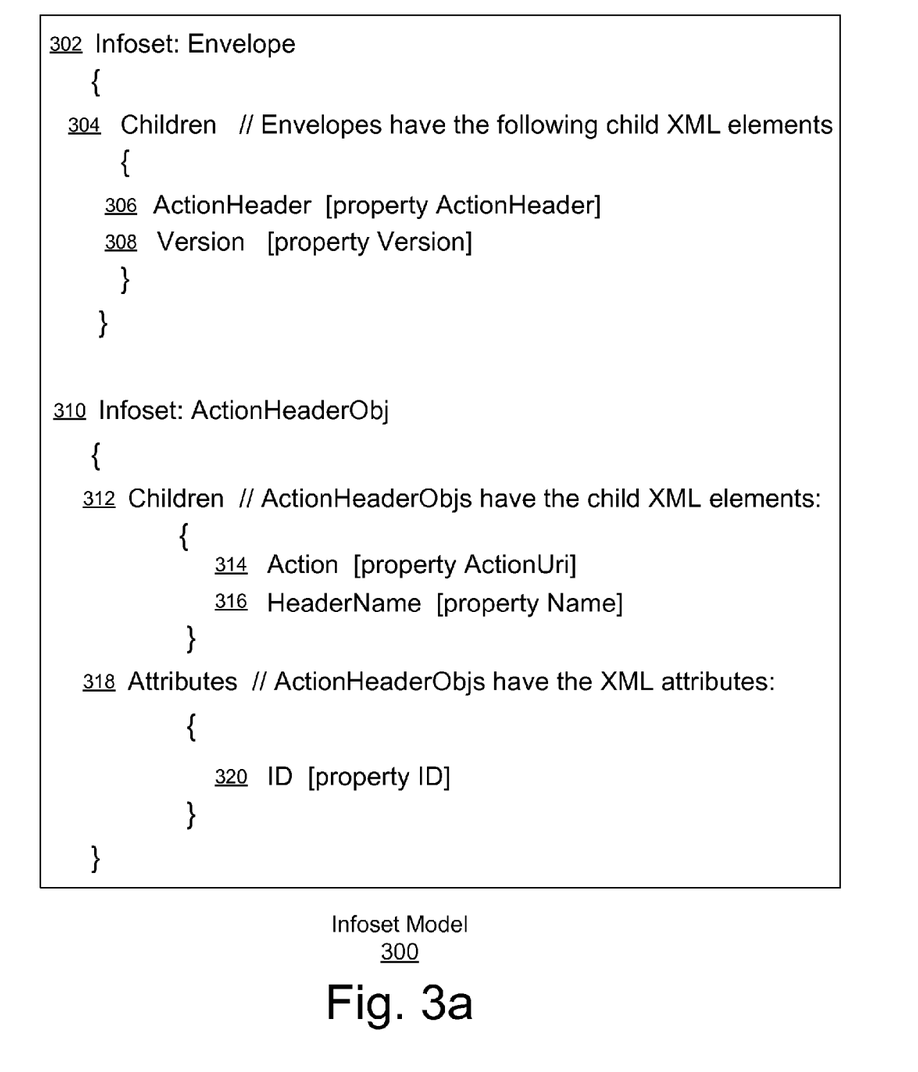
FIG. 3a is a representation of an infoset model for a CLR object.

FIG. 3a depicts an infoset model 300 for the following exemplary CLR-Type:

```
public class Envelope
{public ActionHeaderObj ActionHeader {get'}
    public string Version {get;}}
public class ActionHeaderObj
{{XmlElement ("Action")}
    public string ActionUri {get;}
    {XmlElement ("HeaderName")}
    public string Name {get;}
    {XmlAttribute} public string ID {get;}}
```

The infoset model 300 includes a mapping for every public property that is serializable into XML. The infoset model 300 is shown using pseudo syntax. An actual infoset model may appear differently, but the structure is similar.

The infoset model 300 includes an envelope class 302 that has the following children 304: an ActionHeader property 306 and a Version property 308. The infoset model 300 also includes an ActionHeaderObj class 310 that has the following children 312: an Action property 314 and a HeaderName property 316. The Action property 314 in the present example denotes an ActionURI that is the object of the Action property 314. The ActionHeaderObj class 310 also includes an attribute 318, namely, a property ID 320.

The infoset model 300 is created at runtime for at least two reasons. First, filters are created and added to filter tables at runtime. Second, a given filter is applicable to and satisfied by any object that has a matching XML representation. The full domain of objects that a query could test is undeterminable in advance.

Figure 3B:
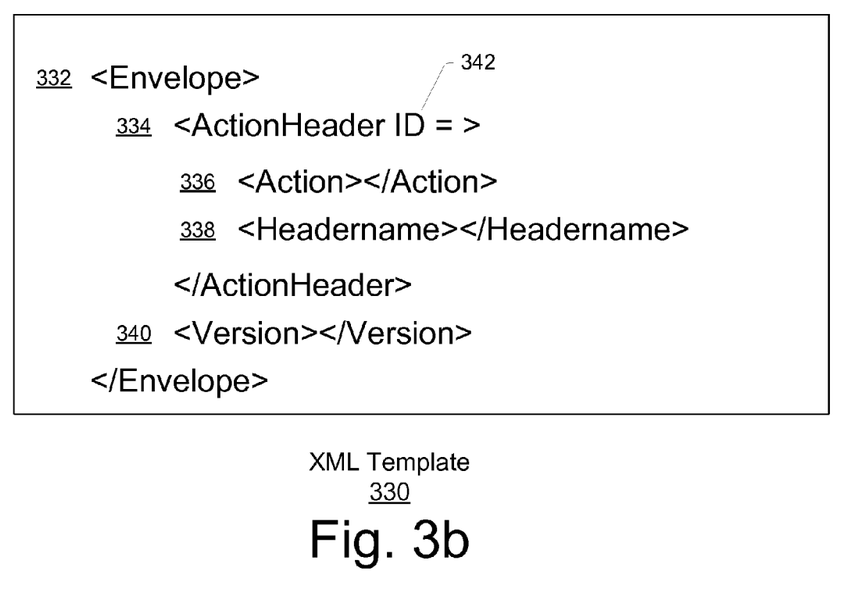

FIG. 3b depicts an XML template 330 that corresponds to the infoset model 300 shown in FIG. 3a. Based on the infoset model 300, instances of the Envelope object would be similar to the XML template 330 if they were structured as XML.

The XML template 330 includes a root element 332 ("Envelope") that corresponds with the envelope class 302 of the infoset model 300. The root element 332 includes two child nodes: an ActionHeader element 334 and a Version element 340. The ActionHeader element 304 has a value 342 that corresponds with the property ID 320 of the infoset model 300.

The ActionHeader element 334 also includes two child nodes: an Action element 336 and a HeaderName element 338. The Action element 336 corresponds with the Action property 314 of the infoset model 300 and the HeaderName element 338 corresponds with the HeaderName property 316 of the infoset model 300.

An infoset model may be constructed in its entirety when a new object is encountered or only to an extent necessary to determine a value in the object specified by a query. In the following description, the latter implementation is described. It is more efficient to construct only the part of the infoset model that is needed because the remainder of the infoset model may never be required.

Any portion of an infoset model that is constructed is stored so that when a corresponding object is subsequently encountered, the work already performed is not repeated. If an object has been previously encountered and a partial infoset has been built, then the partial infoset is retrieved. If an information item specified by a query is already mapped in the partial infoset, the infoset model is not augmented.

If, however, the information item specified by the query has not been previously mapped, the partial infoset is augmented by further mapping until the specified information item is mapped. If no further mapping of the object is required, the augmented infoset model is stored for future reference.

Exemplary System

Figure 4:
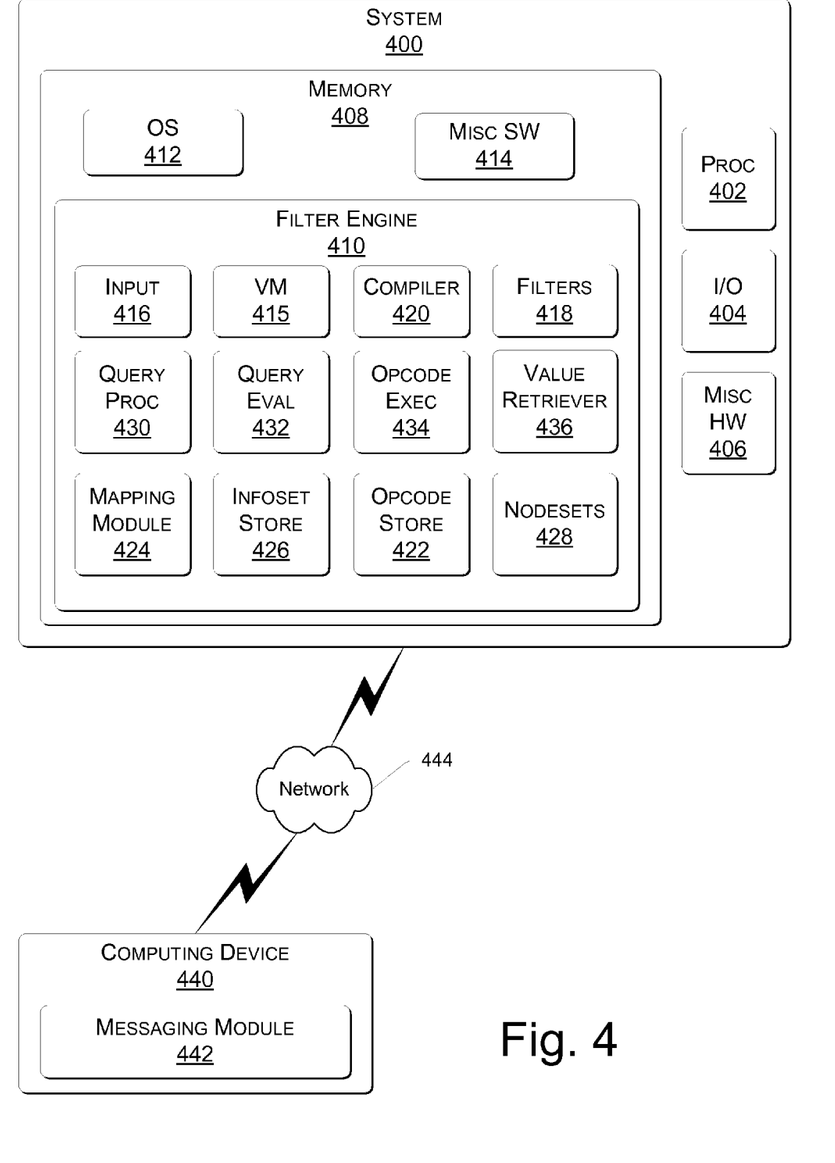
FIG. 4 is a block diagram of a system in accordance with the description provided herein.

FIG. 4 is a block diagram depicting a system 400 suitable for use with the systems and methods described herein. The elements shown in FIG. 4 and described in relation thereto may be implemented as hardware components, software modules or a combination of the two. Attribution of particular functions to particular elements herein is not intended to limit performance of the functions to the elements. Rather, any function included in the following description or any portion thereof may be performed by any element or a combination of more than one element.

The system 400 includes a processor 402, one or more input/output (I/O) modules 404 and miscellaneous other hardware typically found in computing systems that may be required to support the functionality described herein. One or more of the I/O modules 404 may be a component configured to receive and/or transmit electronic data, such as a network interface card. One or more of the I/O modules may also be a component to facilitate entry of data or data processing information, such as a keyboard or a pointing device.

The system 400 also includes memory 408 which may be random access memory (RAM), flash memory, read only memory (ROM), cache memory or the like. Although shown as a single element, it is noted that the memory 408 may be a combination of any type of memory known in the art.

The memory 408 stores a filter engine 410, an operating system 412 and miscellaneous software 414 that may be required to facilitate general system functionality required to implement the techniques described herein.

The filter engine 410 includes a virtual machine 415, an input module 416 configured to receive an input message or some other form of electronic data transmission and one or more filters 418 (queries) that may be stored as a filter table or a plurality of filter tables. The filter engine 410 also includes a compiler 420 configured to parse a query and compile it into opcodes (operation codes) needed to process the query, and an opcode store 422.

The filter engine 410 further includes a mapping module 424 that is configured to map an object to an object infoset (i.e. an object mapping) in an infoset store 426. One or more nodesets 428 used for temporary storage during an inverse query processing operation are associated with the filter engine 410. Matching nodes obtained during a pass of a matching process are stored in the nodesets 428 so they can be used in subsequent passes of the matching process.

Additionally, the filter engine 410 includes a query processor 430 and a query evaluator 432 that are configured to handle the matching process between input values and filter values. An opcode execution module 434 is configured to execute opcodes generated by the compiler 420 and a value retriever 436 is configured to make a method call on an object to retrieve one or more values from the object.

It is noted that although several elements are shown as being included within the filter engine 410, one or more of these elements may be included in the memory 408 or in one or more other components of the system 400. For discussion purposes, such elements have been grouped with the filter engine 410 in the present example.

The system 400 is configured to communicate with a computing device 440 having a messaging module 442 that is configured to send and/or receive messages to/from the system 400 over a network 444 such as the Internet.

Further reference will be made to the elements included in FIG. 4 in the following discussion, and the elements contained therein will be discussed in greater detail.

Exemplary Methodological Implementation

Figure 5:
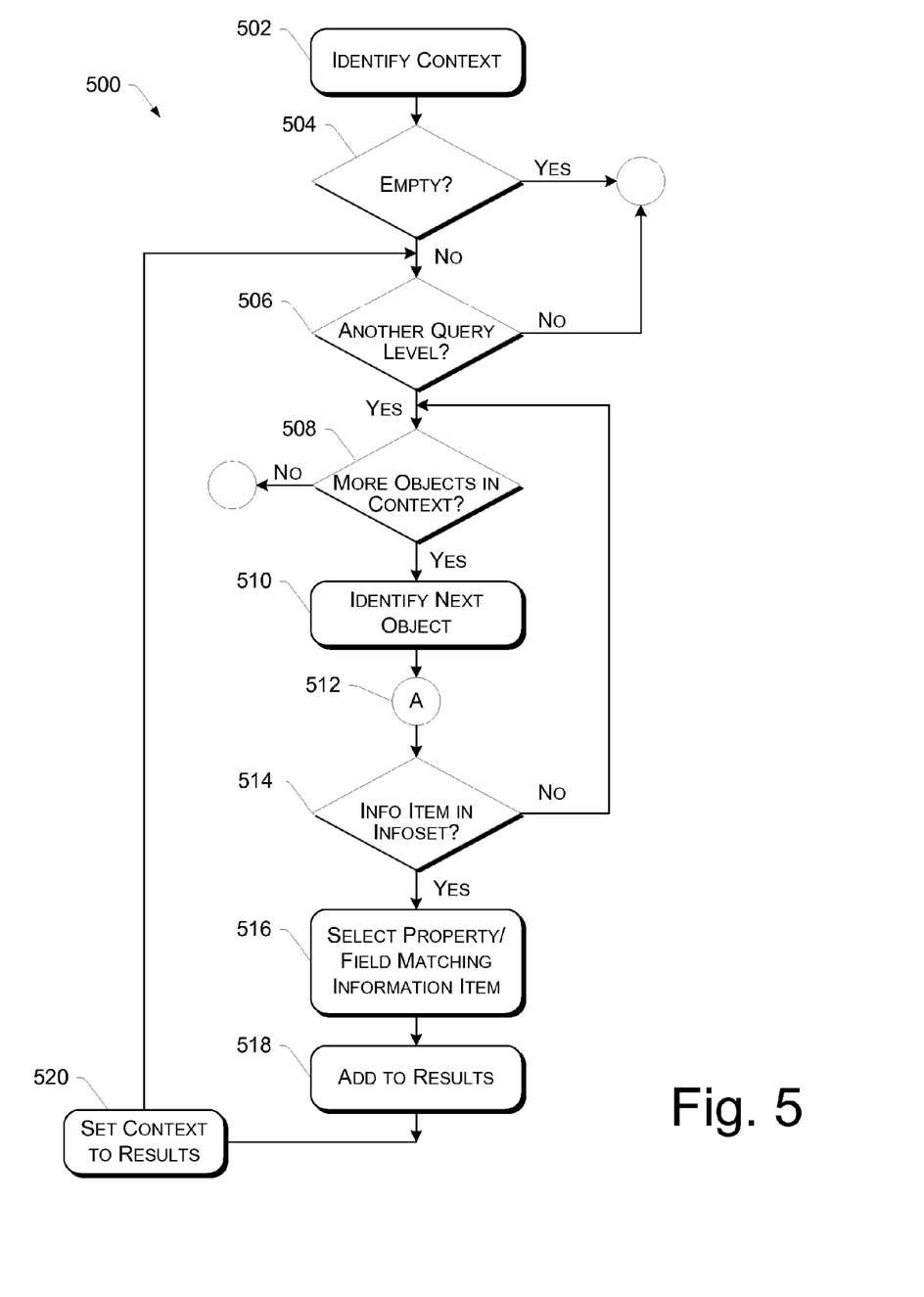
FIG. 5 is a flow diagram that depicts a methodological implementation evaluating a query against a non-conforming object.

FIG. 5 is a flow diagram 500 depicting an exemplary methodological implementation of evaluating a query formed according to a query language format against an object structured according to a different format. In the following discussion, the query is an XPath query and the object is a CLR object, although it is noted that the query or the object may be structured according to one or more other formats. In the following discussion, continuing reference will be made to the elements and reference numerals shown in FIG. 4.

At block 502, the filter engine 410 identifies a CLR object context. If the context is empty or there is nothing in the context to process ("Yes" branch, block 504), then process terminates. Otherwise ("No" branch, block 504), it is determined if there is another level to evaluate in the query being evaluated against the object. If there is not another level to evaluate, the process terminates.

If there is another level to evaluate ("Yes" branch, block 508) and there are more objects in the context ("Yes" branch, block 510), a procedure to map an appropriate infoset model is called at block 512. If, for example, "Book/Title" has been mapped but does not provide a match, now map, e.g., "Book/Author" if there are such objects in the context.

It is noted that since the mapping cannot be accomplished until runtime, certain obstacles must be overcome to complete the mapping. In a .NET implementation, a technology called ".NET Reflection" is used to identify—or "reflect"—a layout of an object at runtime, and can identify object properties, methods, parameters, etc. The infoset model can then be built with this information.

At block 530, the object related to an infoset being sought is identified, or received. The object type is obtained (block 532) by, for example, using a GetType method. If an appropriate infoset model has already been created and is cached ("Yes" branch, block 534), then the process returns to block 514. If additional construction of the infoset model is required ("No" branch, block 534), the Type is reflected at block 536 and the infoset model is built or augmented at block 538. At this point, only the present Type is modeled in the infoset. In other words, no descendants of the Type are modeled at this point because they may not be required. The infoset model is cached at block 540 and the process reverts to block 514 for subsequent processing.

At block 514, a particular information item is sought in the infoset model. In other words, has the mapping that has occurred to date mapped an information item that is required to evaluate the query. If not ("No" branch, block 514), the process reverts to block 506 to determine if there is another level in the query.

If the infoset item includes the information items ("Yes" branch, block 514), a property or field matching the information item is selected at block 516. This step pulls data associated with the information item. The matching data is then added to a results cache, i.e. a nodeset, at block 518.

The results cache is made to be a current context at block 520 and the process begins again at block 506 so that the new context (i.e. the previous results) is processed.

Pseudo Code Algorithm

To help explain the procedure described above, the following pseudo code example is provided. Assume that a query contains location path /a/b/c. The location path is being tested against some object o. The location path has 3 steps. Algorithm (pseudo code):

Algorithm (pseudo code):

```
void Evaluate(LocationPath path, object input)
{
```

Algorithm (pseudo code):

```
    sourceNodeset.Add(input); // set up the initial nodeset
    foreach (step in locationpath)
    {
        resultNodeset = PerformStep(step, sourceNodeset);
        if (null == resultNodeset)
        {
            break; // nothing selected. Stop evaluating this
                   // location path...
        }
        // perform the next step on the results of the previous step
        sourceNodeset = resultNodeset;
    }
}
Nodeset PerformStep(Step step, NodeSet nodeset)
{
    foreach (obj in nodeset)
    {
        i.   Retrieve the Type of obj by calling obj.GetType()
        ii.  If necessary, build a model for that Type and that Type
             alone for but not of its descendants. i.e. there is no need
             to map anything beyond 'level'1 yet. Only map obj. If obj
             was a book, only map Book - do not look at chapters etc
             yet. Any looks at the 'next level' will be driven by the
             location path that is calling PerformStep. One step, one
             level.
        iii. If the model does not contain an information item that maps
             to 'step', then return null (nothing selected)
        iv.  Else, perform the Select 'step' and place the resulting
             nodes in a resultNodeset.
    }
    return resultNodeset;
}
```

Opcode Generation

In at least one implementation, the filter engine 410 compiler 420 generates opcodes and maintains the opcodes in the opcode store 426 for future use. Opcodes are instructions that are executed to evaluate a query. In the present discussion, opcodes are used to execute the steps shown and described in FIG. 5. The opcodes are very efficient because they dynamically generate 'helper' code to perform the same function that would be performed by intermediate language instructions compiled from source code. Generating code implies emitting MSIL instructions into dynamic assemblies. This generated IL is just in time compiled by the .NET runtime and allows the opcode to retrieve property values and fields directly from CLR objects. It is as though the opcodes were executing compiled hand-written source code.

Code is generated when an object of a particular Type/Class (Type/Class are synonymous) or certain elements of the object are encountered for the first time. Thereafter, when the same object elements are required to process a query, the opcodes execute the already generated code to obtain the appropriate information without having to perform more expensive procedures.

Although other methods may be utilized, the opcode generation process increases efficiency of the systems and methods described herein. The following discussion of opcodes is made with reference to the infoset model 300 shown in FIG. 3a, and the corresponding CLR Envelope Object shown above (reproduced below for convenience).

```
public class Envelope
{
    public ActionHeaderObj ActionHeader {get'}
    public string Version {get;}
}
```

-continued

```
public class ActionHeaderObj
{
    {XmlElement ("Action")}
    public string ActionUri {get;}
    {XmlElement ("HeaderName")}
    public string Name {get;}
    {XmlAttribute}
    public string ID {get;}
}
```

Before the filter engine 410 can execute the location path ActionHeader/HeaderName over an Envelope object, it compiles the XPath into an opcode block containing one or more opcodes that can be executed within the filter engine (or other type of virtual machine)

For the location path ActionHeader/HeaderName, the filter engine 410 opcode module 422 would produce, among others, the following select opcodes:

Select #1: to select an XML element named ActionHeader that is a child of Envelope; and Select #2: to select an XML element named HeaderName that is a child of ActionHeader.

The first time that the filter engine 410 evaluates the select opcodes against objects of a particular Type, it takes several preparatory steps. First—for Select #1—the mapping module 428 constructs (or retrieves) at least a portion of an infoset model for the CLR-Type Envelope that was encountered. The filter engine 410 then looks for a child XML element named "ActionHeader" in the infoset model which, in the present example, is the ActionHeader property. If a child element named "ActionHeader" does not already exist, the mapping module 428 creates a wrapper CLR-Type for Envelope. Into each wrapper type, the mapping module 428 writes wrapper methods containing Intermediate Language (IL) to invoke each public property in Envelope that is serializable into XML. This IL is identical to what a compiler for a typical .NET language such as C# would produce. For example, the wrapper type, if represented in the C#, would look like:

```
public class Envelope_Wrapper
{public static ActionHeaderObj GetActionHeader (Envelope env)
    {
        return env.ActionHeader;
    }
    public static string GetVersion(Envelope env)
    {
        return env.Version;
    }
}
```

The wrapper type is a class called Envelope_Wrapper. It contains an equivalent static method for each property on the Envelope object. It could contain similar methods for fields. Each method is written to retrieve the said property from an instance of Envelope. Example, the wrapper method:

```
public static ActionHeaderObj GetActionHeader(Envelope env)
{
    return env.ActionHeader;
}
``` retrieves the ActionHeader property from an object of type Envelope.

This is just one approach. There are other ways to generate equivalents, including generating global methods or functions that are not necessarily contained in a 'wrapping Type'.

It is noted that IL used to dynamically generate Envelope_Wrapper is identical to that which the C# compiler would generate.

Since Select#1 opcode is attempting to retrieve an ActionHeader from objects of Type Envelope, it must now call the GetActionHeader( ) method on Envelope_Wrapper. This call, if represented in C#, would look like. Envelope_Wrapper.GetActionHeader(obj);

The mapping module in 428 generates the IL for this call by creating a delegate for the method GetActionHeaderObj. This delegate is called a selector. It then saves this delegate inside opcode "Select #1."

The filter engine 410 then performs similar tasks related to Select #2. The mapping module 428 attempts to locate an infoset model for the ActionHeaderObj CLR-Type. If no infoset model can be located, at least a portion of such an infoset model is created (see flow diagram, 500, FIG. 5). The mapping module 428 then attempts to locate a child XML element names HeaderName in the infoset model which, in the present example, is the Name property.

If such a CLR-Type does not already exist, the filter engine 410 generates a wrapper CLR-Type for ActionHeaderObj. Into each wrapper type, it writes wrapper methods containing IL to call each public property in ActionHeaderObj that is serializable into XML. A selector is created to invoke the wrapper method for the Name property and the selector is saved into "Select #2."

Although not shown, the wrapper types are maintained by the filter engine 410 in a dynamic assembly (in a .NET implementation). The dynamic assembly is an assembly code module that is generated dynamically (and just in time compiled by the .NET runtime). The wrapper CLR Types and delegates are included in this dynamic assembly.

It is noted that not all selectors need be generated automatically. The filter engine 410 can also support custom hand-coded selectors designed and optimized to work with specific CLR-Types to further enhance efficiency of particular systems.

Finally, to execute the location path ActionHeader/HeaderName over an instance of the Envelope class, the filter engine 410 first evaluates "Select #1" by invoking its selector, which selects the ActionHeader property from Envelope and places the result in the nodeset 434. The filter engine 410 then evaluates "Select #2" by invoking its selector for each node in the nodeset 434 from the previous step.

Subsequent query evaluations that require execution of the ActionHeader/HeaderName location path will execute the opcodes (i.e. "Select #1" and "Select #2"). Execution of these opcodes is very efficient and significantly reduces system resources that are required to evaluate such queries.

Exemplary Computer Environment

Figure 6:
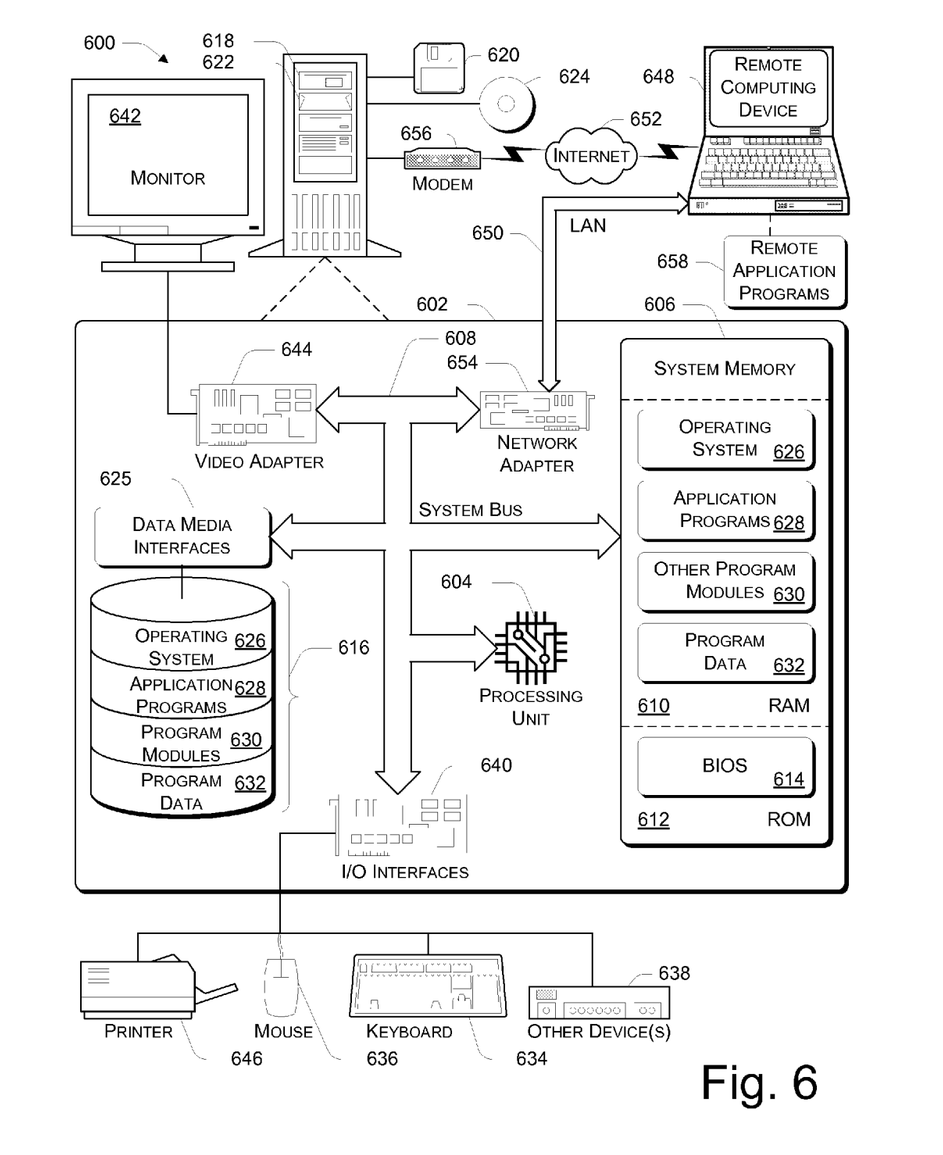
FIG. 6 is a diagram of an exemplary computing environment in which the implementations described herein may operate.

The various components and functionality described herein are implemented with a computing system. FIG. 6 shows components of typical example of such a computing system, i.e. a computer, referred by to reference numeral 600. The components shown in FIG. 6 are only examples, and are not intended to suggest any limitation as to the scope of the functionality of the invention. Furthermore, the invention is not necessarily dependent on the features shown in FIG. 6.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 6, the components of computer 600 may include, but are not limited to, a processing unit 602, a system memory 604, and a system bus 606 that couples various system components including the system memory to the processing unit 602. The system bus 606 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 600 typically includes a variety of computer-readable media. Computer-readable media can be any available media that can be accessed by computer 600 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 600. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 604 includes computer storage media in the form of volatile and/or nonvolatile memory such as read only memory (ROM) 608 and random access memory (RAM) 610. A basic input/output system 612 (BIOS), containing the basic routines that help to transfer information between elements within computer 600, such as during start-up, is typically stored in ROM 608. RAM 610 typically contains data and/or program modules that are immediately accessible to and/or presently being operated on by processing unit 602. By way of example, and not limitation, FIG. 6 illustrates operating system 614, application programs 616, other program modules 618, and program data 620.

The computer 600 may also include other removable/non-removable, volatile/nonvolatile computer storage media. By way of example only, FIG. 6 illustrates a hard disk drive 622 that reads from or writes to non-removable, nonvolatile magnetic media, a magnetic disk drive 624 that reads from or writes to a removable, nonvolatile magnetic disk 626, and an optical disk drive 628 that reads from or writes to a removable, nonvolatile optical disk 630 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 622 is typically connected to the system bus 606 through a non-removable memory interface such as data media interface 632, and magnetic disk drive 624 and optical disk drive 628 are typically connected to the system bus 606 by a removable memory interface such as interface 634.

The drives and their associated computer storage media discussed above and illustrated in FIG. 6 provide storage of computer-readable instructions, data structures, program modules, and other data for computer 600. In FIG. 6, for example, hard disk drive 622 is illustrated as storing operating system 615, application programs 617, other program modules 619, and program data 621. Note that these components can either be the same as or different from operating system 614, application programs 616, other program modules 618, and program data 620. Operating system 615, application programs 617, other program modules 619, and program data 621 are given different numbers here to illustrate that, at a minimum, they are different copies. A user may enter commands and information into the computer 600 through input devices such as a keyboard 636 and pointing device 638, commonly referred to as a mouse, trackball, or touch pad. Other input devices (not shown) may include a microphone, joystick, game pad, satellite dish, scanner, or the like. These and other input devices are often connected to the processing unit 602 through an input/output (I/O) interface 640 that is coupled to the system bus, but may be connected by other interface and bus structures, such as a parallel port, game port, or a universal serial bus (USB). A monitor 642 or other type of display device is also connected to the system bus 606 via an interface, such as a video adapter 644. In addition to the monitor 642, computers may also include other peripheral output devices 646 (e.g., speakers) and one or more printers 648, which may be connected through the I/O interface 640.

The computer may operate in a networked environment using logical connections to one or more remote computers, such as a remote computing device 650. The remote computing device 650 may be a personal computer, a server, a router, a network PC, a peer device or other common network node, and typically includes many or all of the elements described above relative to computer 600. The logical connections depicted in FIG. 6 include a local area network (LAN) 652 and a wide area network (WAN) 654. Although the WAN 654 shown in FIG. 6 is the Internet, the WAN 654 may also include other networks. Such networking environments are commonplace in offices, enterprise-wide computer networks, intranets, and the like.

When used in a LAN networking environment, the computer 600 is connected to the LAN 652 through a network interface or adapter 656. When used in a WAN networking environment, the computer 600 typically includes a modem 658 or other means for establishing communications over the Internet 654. The modem 658, which may be internal or external, may be connected to the system bus 606 via the I/O interface 640, or other appropriate mechanism. In a networked environment, program modules depicted relative to the computer 600, or portions thereof, may be stored in the remote computing device 650. By way of example, and not limitation, FIG. 6 illustrates remote application programs 660 as residing on remote computing device 650. It will be appreciated that the network connections shown are exemplary and other means of establishing a communications link between the computers may be used.

CONCLUSION

The systems and methods as described thus provide an efficient way to test queries structured according to a first protocol (such as XML queries) against inputs containing objects structured according to a second protocol that is different from the first protocol (such as CLR objects). Since an object does not have to be serialized, the costly serialization step is not executed, thereby reducing system overhead required to evaluate queries against the object.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A filter engine stored on one or more computer-readable storage media, comprising:
   a compiler configured to parse a query input according to a query language against an object constructed according to a non-conforming format;
   a mapping module configured to construct an infoset model at runtime to identify at least one object property that conforms to the query language;
   the infoset model being configured to assign an envelope class with a child element for each of the at least one object properties;
   one or more filters that are created and added to filter tables at runtime;
   the one or more filters being derived from the query language, each filter containing at least one condition specifying a query value that can be compared to one or more filter engine inputs;
   an input function configured to receive the query input for comparison against the one or more filters wherein the query input may contain the object derived from an object language that is different from the query language, the object language is Common Language Runtime (CLR) and the query language is XPath;
   the mapping module being configured to reference an object infoset and map at least one object property identified in the object infoset to an object template that is in accordance with the query language without serializing data included in the object;
   wherein the filter engine is further configured to locate an object property value by referencing the object template to locate the object property in the object infoset, and to evaluate the object property value against the query value;
   a value retriever configured to compare whether the object property value matches against the query value; and
   the filter engine further configured to return the query value when there is a match.

2. The filter engine as recited in claim 1, wherein the mapping module is further configured to create the object infoset or to augment a partial object infoset retrieved from memory.

3. The filter engine as recited in claim 1, wherein the mapping module is further configured to store the object infoset if the mapping module has changed the object infoset.

4. The filter engine as recited in claim 1, further comprising:
   an opcode generation module configured to generate one or more opcodes to automatically perform one or more of the filter engine procedures upon a first encounter with the object;
   an opcode store for storing opcodes generated by the opcode generation module; and
   wherein the one or more opcodes can be used to perform the one or more filter engine procedures upon a subsequent encounter with the object.

5. The filter engine as recited in claim 4, wherein the opcodes can be dynamically compiled and executed at runtime.

6. The filter engine as recited in claim 1, wherein the query language and the object language are hierarchically structured so that hierarchy levels of the object infoset have corresponding level in the hierarchy of the object template.

7. A computer-implemented method comprising:
   evaluating a query input according to a query language against an object constructed according to a non-conforming format;
   constructing an infoset model at runtime to identify at least one object property that conforms to the query language;
   assigning an envelope class in the infoset model with a child element for each of the object property;
   creating and adding one or more filters to filter tables at runtime;
   deriving the one or more filters from the query language, each filter containing at least one condition specifying a query value that can be compared to one or more filter engine inputs;
   receiving an input for comparison against the one or more filters wherein the input may contain the object derived from an object language that is different from the query language, the object language is Common Language Runtime (CLR) and the query language is XPath;

referencing an object infoset and mapping at least one object property identified in the object infoset to an object template that is in accordance with the query language without serializing data included in the object;

locating an object property value by referencing the object template to locate the object property in the object infoset, and evaluating the object property value against the query value;

comparing whether the object property value matches against the query value; and returning the query value when there is a match.

8. The method as recited in claim 7, further comprising a mapping module configured to create the object infoset or to augment a partial object infoset retrieved from memory.

9. The method as recited in claim 7, further comprising a mapping module configured to store the object infoset if the mapping module has changed the object infoset.

10. The method as recited in claim 7, further comprising:

generating one or more opcodes to automatically perform one or more of the filter engine procedures upon a first encounter with the object;

storing opcodes generated by the opcode generation module; and wherein the one or more opcodes can be used to perform the one or more filter engine procedures upon a subsequent encounter with the object.

11. The method as recited in claim 7, wherein the opcodes can be dynamically compiled and executed at runtime.

12. The method as recited in claim 7, wherein the query language and the object language are hierarchically structured so that hierarchy levels of the object infoset have corresponding level in the hierarchy of the object template.

13. A computer-readable storage media containing computer-executable instructions, implemented at least in part by a computing device, the computer-executable instructions comprising:

evaluating a query input according to a query language against an object constructed according to a non-conforming format;

constructing an infoset model at runtime to identify at least one object property that conforms to the query language;

assigning an envelope class in the infoset model with a child element for each of the object property;

creating and adding one or more filters to filter tables at runtime;

deriving the one or more filters from the query language, each filter containing at least one condition specifying a query value that can be compared to one or more filter engine inputs;

receiving an input for comparison against the one or more filters wherein the input may contain the object derived from an object language that is different from the query language, the object language is Common Language Runtime (CLR) and the query language is XPath;

referencing an object infoset and mapping the at least one object property identified in the object infoset to an object template that is in accordance with the query language without serializing data included in the object;

locating an object property value by referencing the object template to locate the object property in the object infoset, and evaluating the object property value against the query value;

comparing whether the object property value matches against the query value; and returning the query value when there is a match.

14. The computer-readable storage media as recited in claim 13, further comprising a mapping module configured to create the object infoset or to augment a partial object infoset retrieved from memory.

15. The computer-readable storage media as recited in claim 13, further comprising a mapping module configured to store the object infoset if the mapping module has changed the object infoset.

16. The computer-readable storage media as recited in claim 13, further comprising:

generating one or more opcodes to automatically perform one or more of the filter engine procedures upon a first encounter with the object;

storing opcodes generated by the opcode generation module; and wherein the one or more opcodes can be used to perform the one or more filter engine procedures upon a subsequent encounter with the object.

17. The computer-readable storage media as recited in claim 13, wherein the opcodes can be dynamically compiled and executed at runtime.

18. The computer-readable storage media as recited in claim 13, wherein the query language and the object language are hierarchically structured so that hierarchy levels of the object infoset have corresponding level in the hierarchy of the object template.

* * * * *